United States Patent [19]

Rozmus

[11] Patent Number: 4,575,607
[45] Date of Patent: Mar. 11, 1986

[54] ROTARY WELDING OF ELECTRICAL CONTACTS IN A PROGRESSIVE DIE

[76] Inventor: John J. Rozmus, 1030 Derwydd La., Berwyn, Pa. 19312

[21] Appl. No.: 555,601

[22] Filed: Nov. 28, 1983

[51] Int. Cl.⁴ .............................................. B23K 11/06
[52] U.S. Cl. ..................................... 219/83; 219/56.22
[58] Field of Search ................... 219/56.22, 81, 82, 83, 219/84, 78.16

[56] References Cited

U.S. PATENT DOCUMENTS

| | | | |
|---|---|---|---|
| 3,475,816 | 11/1969 | Willoughby | 219/83 X |
| 4,099,043 | 7/1978 | Rozmus | 219/78.16 |
| 4,319,708 | 3/1982 | Lomerson | 228/111 |

FOREIGN PATENT DOCUMENTS

| | | | |
|---|---|---|---|
| 1040718 | 8/1957 | Fed. Rep. of Germany | 219/81 |
| 2905026 | 9/1980 | Fed. Rep. of Germany | 219/84 |
| 2365401 | 5/1978 | France | 219/82 |

*Primary Examiner*—Clifford C. Shaw
*Assistant Examiner*—C. M. Sigda
*Attorney, Agent, or Firm*—Frederick J. Olsson

[57] ABSTRACT

In the manufacture of electrical spring contacts each having a gold-plated contact element welded thereto, a method of providing such a contact element by welding a gold-plated surface strip to a body strip with a pair of welding electrodes in the form of rollers located between the punch and die pad bolsters of a progressive die to effect one or more welds between the strips during the interval the punch pad bolster is in its return stroke mode whereby the subsequent punching out of the finished contacts can be done without disturbing the welds and each such welded part of the surface strip constitutes the gold-plated contact element.

3 Claims, 7 Drawing Figures

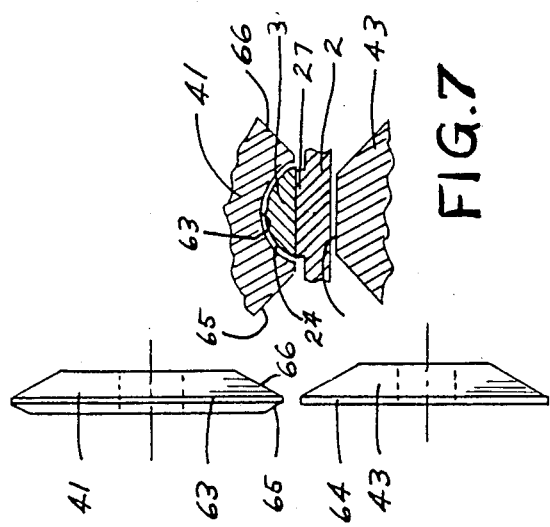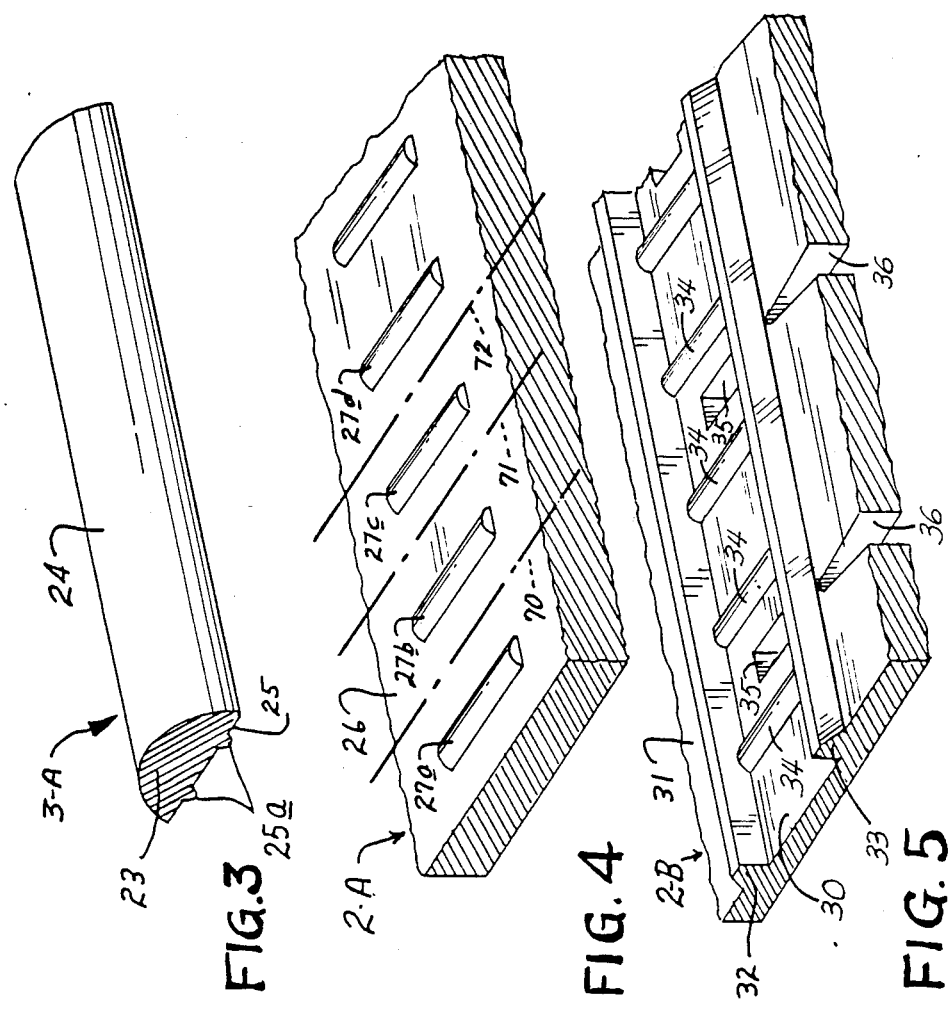

ROTARY WELDING OF ELECTRICAL CONTACTS IN A PROGRESSIVE DIE

This invention relates to electrical spring contacts of the type stamped out in a progressive die for use in connectors and/or printed circuit boards of computers and communications equipment and the like, such contacts having a precious metal contact-making area.

More particularly, the invention relates to such contacts which are comprised of a base or body having a contact element welded thereto, the contact element having a precious metal contact-making area.

Progressive dies of the kind in question have a fixed die pad bolster and a reciprocating punch pad bolster mounted to move in a working stroke from a return position toward the die pad bolster where the punches, in cooperation with the dies, form the contacts and thereafter move away from the die pad bolster in a return stroke to the return position together with drive means to move strips between the bolsters during the interval the punch pad bolster is in its return stroke and for fixing the position of the strip when the punch pad bolster is in its working stroke for engaging and forming the contacts.

Specifically, the invention provides a method for welding a surface strip having precious metal surface to a base or body strip during the time the strips are being worked in the progressive die to form the contacts with each weld area being located at a precise axial location whereby the contacts can be stamped out without disturbing or shearing the weld area.

The invention contemplates using the die to form (prior to welding) a series of current directors or beads on the top surface of the body strip and precisely spaced along the strip axis, placing the surface strip over the body strip for the underside to engage with the beads, then while the punch pad bolster is in the return stroke, feeding the engaged strips between a pair of rollers (located on the die pad to be free of contact by the punch pad) and at the precise time each bead is between the rollers, supplying a pulse of current to melt the bead and the contiguous areas of the strips for effecting the weld. After the welds are made as aforesaid, the die finishes the stamping of contacts of desired form and type and with a contact element welded thereto whose weld is untouched by the stamping operation.

Preferably, the foregoing utilizes a surface strip the underside of which has one or more current directors or welding tips extending along the axis of the strip and adapted to engage the welding bead on the body strip.

More specifically, the invention contemplates making the linear distance between adjacent directors an amount providing that two beads will pass between the rollers as the strips are moved during the return stroke interval so that two precisely positioned welds will occur during the return stroke.

In connection with the foregoing, the invention utilizes a precious metal surface on the surface of the roller which is engaged with the surface strip.

The invention will be explained below in connection with the following drawings wherein:

FIG. 3 is a perspective, diagramatic view of a section of a typical surface strip, used in practicing the invention;

FIG. 4 is a perspective, diagramatic view of a section of a typical base or body strip used in practicing the invention;

FIG. 5 is a perspective, diagramatic view of a section of another typical base or body strip used in practicing the invention;

FIG. 6 is an elevational view of rollers used for practicing the invention; and

FIG. 7 is an enlarged, fragmentary view illustrating the surface and body strips between the rollers of FIG. 6 in condition for a welding operation.

Figures 1, 2:
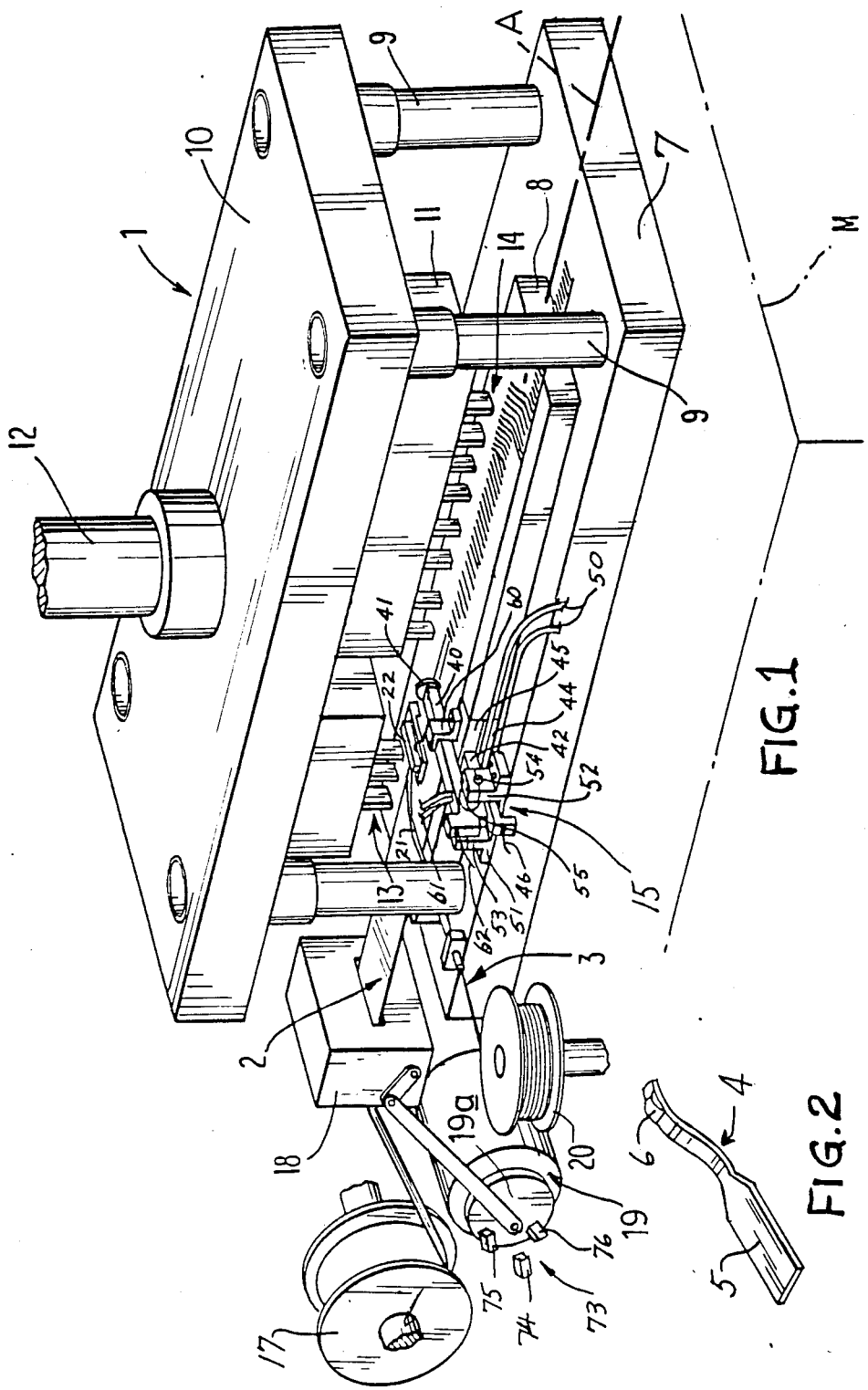
FIG. 1 is a diagramatic view illustrating a progressive die for use in practicing the invention.
FIG. 2 is a perspective, diagramatic view of a typical spring contact.

In FIG. 1, I have shown a portion of a press or stamping machine M incorporating a progressive die 1. A base or body strip 2 and a surface strip 3 are intermittently moved (left to right) through the die along the axis A where they are stamped and welded into electrical contacts. Typical of such contacts is the contact 4 diagramatically illustrated in FIG. 2 which comprises a contact body 5 and a contact element 6 welded to the body. The contact element 6 has a precious metal surface. The contact 4 is similar to the contacts shown in my Pat. No. 3,990,864.

The invention is directed to a method of welding which, when the contact has been completely stamped out, will provide the weld between the body 5 and the contact element 6.

The progressive die has the die bolster 7 which is fixedly mounted on the press and carries a die pad 8. Guide pins 9 extending up from the die bolster carry the punch pad bolster 10 mounted on the punch pad 11. The punch pad bolster 10 is adapted to be moved on the pins 9 toward and away from die pad bolster 7 as by the drive means noted at 12.

The punch pad 11 carries a first group of punches 13 and a second group of punches 14. The function of the punches 13 is to work the body strip prior to the welding of the surface strip thereto and the function of the punches 14 is to stamp the composite strip after welding into funished contacts.

The die pad 8 carries corresponding dies which for the sake of clarity I have not shown. The welding mechanism 15 of the invention is mounted on the die pad bolster 7 between the two groups of punches and is free from contact by the punch pad when the same moves in the working and return strokes.

The respective mating punches and dies are spaced at stations along the axis A. A stripper plate mechanism which is needed in dies of this kind has been omitted for purposes of clarity. The stripper plate guides the strip 2 along the axis A and maintains the strip against lateral movement.

The punch pad bolster is moved on the pins 9 by the drive means 12 from a return position (up) in a working stroke down toward the die pad bolster where the strips are worked by the punches 13 and 14 and then moves in a return stroke away from the die pad bolster to the return position.

The body strip 2 is mounted on a roll 17 and pulled off the roll and intermittently fed along the axis A by the feeder 18 operated by the motor-eccentric mechanism 19. The feeder moves the strip when the punch pad bolster is in the return stroke and holds the strip stationary during the working stroke. The welder 15 is arranged to function for the welding operation during the return stroke as will be explained hereafter. The surface strip 3 is mounted on the roll 20 and is conducted into the die by a guide tube 21 which directs the strip into a funnel mechanism 22 mounted over the body strip 2. When surface strip 3 is welded to the body strip 2 it will be pulled through the die by the body strip motion.

With the exception of the welding mechanism 15, the above mentioned parts are similar to the corresponding parts shown in my Pat. No. 3,990,864. Note that the die pad 8 is split into two parts so that the welding mechanism 15 can be sandwiched between the same and the punch pad 11 is also split to accomodate the welding mechanism. One principal difference over the welder of Pat. No. 3,990,864 is that neither the punch pad 11 nor any part thereon contacts the welding mechanism either on the working or return strokes. For certain body strips, the die pad is further modified as will be noted later.

The invention contemplates the welding of the surface strip to the body strip either on the top surface of the strip or on the bottom of a capture slot formed on the top surface of the strip. This will be explained below in connection with FIGS. 3, 4, and 5.

A section 3-A of a typical surface strip 3 is illustrated in FIG. 3. The strip is a copper alloy and has a cross section such as shown. The strip comprises a base 23 and a top contoured contact surface 24 which has an integral film of precious metal which is preferably gold. Conventionally, the strip is nickel plated under the gold surface to prevent bleeding. The approximate width and heighth of the strip are respectively 0.006 inches and 0.025 inches. For welding purposes, the underside 25 of the strip may be flat but preferably is provided with one or more current directors such as a pair of welding tips 25a.

A body strip 2 typically has a rectangular cross section and is approximately 1¼ inchs wide and 0.025 inches thick and made of a copper alloy which provides the spring or resilient characteristic. A section 2-A of a body strip is shown in FIG. 4. Only the section 2-A is illustrated since it is in this area that welding is effected. The form of the remainder of the strip is not illustrated as this will depend on the type of contact. The body strip is provided with current directors as indicated in FIG. 4 where the section 2-A has its top surface 26 formed with a plurality of current directors or welding beads 27a, 27b, 27c, 27d, etc. spaced along the axis of the strip and extending normal thereto. The welding beads are formed by one or more of the punches 13 in cooperation with punches in the die pad which strike the bottom of the strip and push metal into appropriately shaped cavities in the punches 13. In a typical strip, the welding beads 27a, etc. are spaced 0.030 inches apart.

A typical contact may be of the type shown in my Pat. No. 3,990,864; i.e. employing a capture slot and capture projections on the body strip for mechanically enveloping the contact element. In such cases, the current directors or welding beads are formed on the bottom of the capture slot. Thus, with reference to FIG. 5, a section 2-B of a body strip has a capture slot 30 formed in its top surface 31 with protections 32 and 33 on opposite sides of the slot. The capture slot and projections are formed by punches 13. The current directors or welding beads 34 are formed in the bottom of the capture slot also by punches 13. Normally, the welding beads 34 are formed by the punches 13 at the time the section of the strip is coined to provide the slot 30 and projection 32 and 33. For coining purposes, the metal relief holes 35 and relief slots 36 are formed.

For welding purposes, the surface strip is aligned so that it is above and parallel to the body strip and the same positioned for the flat underside of the welding tip or tips thereon to engage with one or more beads. The foregoing is accomplished by the funnel 22 working in conjunction with the welder 15 as will be noted below.

Referring now to FIG. 1 the general structure of welding mechanism 15 will be explained. The structure is the same as the welding in my Pat. No. 4,099,043 with changes as will be noted below.

An upper electrode arm 40 is pivotally mounted on the fixed die bolster 7 and carries an electrode in the form of a roller 41 which is adapted to engage the top of the surface strip. A lower electrode arm 42 is fixedly mounted on the fixed die bolster 7 and carries an electrode in the form of a lower roller (not shown in FIG. 1) which is disposed to engage the underside of the body strip. The lower roller is indicated at 43 in FIGS. 6 and 7. The arms 40 and 43 are conductors to supply power to the rollers 41 and 43.

For purposes of clarity, I have omitted the screw/clamp means for connecting the rollers to the arms. Suffice it to say each screw/clamp provides for its roller to rotate relative to the arm and for the inside surface of each roller to make substantial area contact, (sliding) with the end of the arm. This contact area is for heat transfer purposes, the dissipation of which is provided for as noted below.

The arms 40 and 42 are both relatively narrow, rectangular in shape, and project or extend into the die between the bolsters 7 and 10 and are oriented generally 90° to the strips on the axis A. The rollers 41 and 43 are set up on the arms one over the other as seen in FIGS. 6 and 7 precisely in the path of the strips 2 and 3 where the welding thereon is to take place.

The lower arm 42 is mounted on the fixed die bolster 7 as follows. An insulating block 44 is carried by the bolster 7. The arm 42 is held down on the block 44 by the insulated clamp 45. The block 44 and clamp 45 are held down on the die bolster 7 as by appropriately placed screws. The outboard end of the lower arm 42 carries the roller 43 and the outboard end carries the electrical terminal 46.

The welding operation develops considerable heat and for dissipating the same the lower arm 42 is provided with cooling means. This takes the form of internal ducts joined with fluid lines 50 connected to a pump not shown.

The upper arm 40 is mounted on the fixed die bolster 7 as explained following. An insulated block 51 is fastened to fixed die bolster 7 and has a pair of posts 52 and 53 which carry a pivot rod 54. The pivot rod 54 carries a spacer 55 and insulated bushing (not shown) which extends through a bearing (not shown) in the arm 41 and rotatably mounts the arm on the block 53 or fixed die bolster 7 so that roller 41 is capable of reciprocating motion toward and away from the lower roller 43.

A housing 60 made of insulating material is mounted on the clamp 46 and carries a compression spring (not shown) which urges the upper arm 40 downwardly and hence the upper roller 41 downwardly.

Similar to the lower arm 42, the upper arm 40 has interior cooling duct (not shown) supplied by the fluid lines 61 connected to the cooling fluid pump. The outer end of the upper arm 40 carries the electrical connector 62.

In FIG. 6 the rollers 41 and 43 are shown with the circumferential surfaces 63 and 64 which face one another. The strips 2 and 3 to be welded are disposed between these circumferential surfaces as shown in FIG. 7.

The circumferential surface 64 of the lower roller 43 is flat and is adapted to engage the underside of the body strip particularly in the area encompassed by the length of a current director or welding bead 27a, etc. or 34. The circumferential surface 63 of the upper roller 41 is contoured the same as and fits over the surface 24 of the surface strip 3.

The invention contemplates that the circumferential surface 63 of upper roller 41 be gold plated. This is for the purpose of minimizing the sputtering of copper or any alloy of the roller 41 on the surface 24 which, otherwise, would greatly impair its reliability. For plating the surface 63 of the roller 41, I normally plate the whole tip which includes the slanted side portion 65 and a corresponding amount on portion 66. This makes the plating operation much easier and speedier since masking out of all surfaces except the surface 24 is eliminated. Welding may be done with half or the full cycle current. The option of full or half cycle is made practical by the gold plating of the upper roller 41. I have used the term "pulse" herein and it will be understood this will encompass full or half wave welding current. The source for supplying power to the rollers 41 and 43 need not be shown as this type of equipment is conventional. The time of the triggering of the source to supply power is an important step in the invention and is commented on below.

For initiating the welding operation, the surface and body strips are placed between the rollers as noted in connection with FIG. 7. The body strip, or more precisely the welding beads thereon, will be properly aligned with respect to the rollers 41 and 43 since the lateral position of the strip is set by alignment pins in the bolster.

The funnel 22 is positioned so that the surface strip 3 exits with relation to the body strip 3 in the area where the weld will take place. When the surface strip 3 is positioned between the rollers with the surfaces 24 and 63 engaging, the surface 24 will be properly aligned.

The strips 2 and 3 are set up by raising the upper roller 41 against the spring pressure and threading the strips in position.

The pressure exerted by the spring in housing 60 causes the rollers to be in tight engagement with the strips therebetween. The pressure of the engagement is such that when the strips are moved axially, the rollers will be rotated an equivalent angular distance.

One prime advantage of the invention is that the welding can be effected at precise points so that the weld remains intact during the subsequent shaping the trimming and the points located so close to one another that material waste is minimized. This is done by spacing the welding beads at the exact positions desired and then triggering the welding current source at the instant a bead is between or in alignment with the rollers. This insures that each weld is located at the exact axial location desired and subsequent shaping and shearing can be done along in areas to avoid the welds.

Thus, referring to FIG. 4, when the composite body and surface strips are sheared along the lines 70 and 71 on opposite sides of bead 27b by punches 14 in the subsequent forming of the contacts, the portion of the surface strip between these lines will form the contact element (such as element 6 in FIG. 2) of the contact which will be secured in place by the weld made in the area of bead 27b. Subsequent operations by punches 14 to form the contact will not affect the weld. The same holds for shearing along the lines 71–72, etc.

As previously mentioned, welding is accomplished during the interval in which the punch pad bolster is in the return stroke and the composite strips 2 and 3 are being moved (and causing the rollers 41 and 43 to rotate). Thus, the spacing between beads is chosen so that one or more beads (preferably two) pass through the rollers during the return stroke interval. With two or more welds per return stroke, the contact bodies can be subsequently stamped with minimum waste of material. As will be understood, with each 360° rotation of the flywheel 19a represents on cycle of the punch pad reciprocating motion and of the strip intermediate motion. During a first 180° rotation, the punch pad is moving in the return stroke and the drive 12 moves the strip 2 and in the next 180° of rotation when the punch pad is moving in the working stroke the drive holds the strip stationary.

Thus, to initiate each weld or trigger the source of power, I employ a magnetic switch 73 associated with a flywheel set up to be activated during a first 180° interval.

Referring to FIG. 1, a section 74 of the switch 73 is fixed on the press and a pair of trigger sections 75 and 76 mounted to rotate with the flywheel 19a. Each time a rotating section 75 or 76 passes the fixed section 74 the power source is activated to supply a welding pulse. The angular distance between the sections 75 and 76 is the equivalent to the linear distance between welding beads.

With the above in mind, I will now comment generally on the welding operation. As previously mentioned, the underside of a surface strip may have one or more welding tips or may be flat or without welding tips. In either case, the same action for welding takes place.

First, the strips 2 and 3 are threaded between the rollers 41 and 43 as described above with, way, the bead 27d between or aligned with the rollers. The tip 25a of the bead 27d is engaged with the tip or tips on the surface strip or the flat underside of same. With the parts arranged as aforesaid, a welding pulse is applied and the tips and bead melt and the roller pressure forces the strip 3 down on the strip 2 with the strips being welded together.

The strips continue moving and when the next bead 27c is aligned or is between the rollers, a welding pulse is applied and the tips and bead melt and the roller pressure forces the strip 3 down on the strip 2 with the strips welded together.

The above welding action takes place in a first 180° rotation of flywheel 19a as mentioned above. The strips now come to rest for the next 180° rotation of the flywheel while the strips are worked by the punches.

At the next first 180° of rotation, the strips again move and when the next bead 27b is aligned or between the rollers another welding pulse is applied and the strips are welded together as described above.

As the welding process continues as above described, the composite strip is fed into the punches 14 to be stamped into a finished contact.

I claim:

1. The method of welding a surface strip having a precious metal surface to a body strip, the welded strips to be at least partially fabricated into electrical spring contacts by a progressive die comprising the steps of:

providing a progressive die having a fixed die pad bolster and a reciprocating punch pad bolster mounted to move in a working stroke from a return position toward the die pad bolster and then in a return stroke away from the die pad bolster to the return position, punch and die means respectively mounted on the bolsters, and drive means for moving a flat body strip along a horizontal axis between the bolsters when the punch pad bolster is in the return stroke and for stopping the body strip when the punch pad bolster is in the working stroke for working by said punch and die means to form electrical contacts;

providing an elongated, flat body strip;

providing an elongated surface strip, the topside of which has a contoured precious metal surface and the underside of which has at least one welding tip extending along the axis of the surface strip;

providing a first electrode in the form of a first roller rotatably mounted on the fixed die pad bolster and electrically insulated therefrom and having a flat circumferential surface; providing second electrode in the form of a second roller rotatably mounted on the fixed die pad bolster above said first roller and electrically insulated from the fixed die pad bolster and having a circumferential surface the same shape as the contour of said precious metal surface and being plated with precious metal the same as the precious metal surface on said surface strip;

providing a source to supply power to said electrodes;

using the punch and die means, forming a plurality of spaced apart welding beads on the body strip, the beads being serially spaced along the axis of the body strip and extending normal thereto;

after the forming of said beads, placing said surface strip on said body strip over said welding beads and positioning said strips between said rollers with the underside of the body strip engaging the flat circumferential surface of the first roller and the contoured circumferential surface of the second roller engaging the contoured precious metal surface strip whereby said welding tip engages one of said welding beads;

providing spring means urging the first and second rollers together whereby said tip tightly engages said bead; twice energizing said electrodes from said source during each said return stroke and during the time when the strips are moving and the rollers are rotating, one energizing period occuring when said rollers are aligned with one bead and the next period occuring when the rollers are aligned with the next adjacent bead;

the welding of the surface strip to the body strip causing the surface strip to move in unison with the body strip when said drive means moves the body strip; and said engagement of the rollers with the surface and body strip causing said rollers to rotate when the strips are moving in unison.

2. The method of welding a surface strip having a precious metal surface to a body strip, the welded strips to be at least partially fabricated into electrical spring contacts by a progressive die comprising the steps of:

providing a progressive die having a fixed die pad bolster and a reciprocating punch pad bolster mounted to move in a working stroke from a return position toward the die pad bolster and then in a return stroke away from the die pad bolster to the return position, punch and die means respectively mounted on the bolsters, and drive means for moving a flat body strip along a horizontal axis between the bolsters when the punch pad bolster is in the return stroke and for stopping the body strip when the punch pad bolster is in the working stroke for working by said punch and die means to form electrical contacts;

providing an elongated, flat body strip;

providing an elongated surface strip, the topside of which has a contoured precious metal surface;

providing a first electrode in the form of a first roller rotatably mounted on the fixed die pad bolster and electrically insulated therefrom and having a flat circumferential surface;

providing second electrode in the form of a second roller rotatably mounted on the fixed die pad bolster above said first roller and electrically insulated from the fixed die pad bolster and having a circumferential surface the same shape as the contour of said precious metal surface and being plated with precious metal the same as the precious metal surface on said surface strip;

providing a source to supply power to said electrodes;

using the punch and die means, forming a plurality of spaced apart welding beads on the body strip, the beads being serially spaced along the axis of the body strip and extending normal thereto;

after the forming of said beads, placing said surface strip on said body strip over said welding beads and positioning said strips between said rollers with the underside of the body strip engaging the flat circumferential surface of the first roller and the contoured circumferential surface of the second roller engaging the contoured precious metal surface strip whereby the underside of said surface strip engages one of said welding beads;

providing spring means urging the first and second rollers together whereby said underside of the surface strip tightly engages said bead;

twice energizing said electrodes from said source during each said return stroke and during the time when the strips are moving and the rollers are rotating, one energizing period occuring when said rollers are aligned with one bead and the next period occuring when the rollers are aligned with the next adjacent bead;

the welding of the surface strip to the body strip causing the surface strip to move in unison with the body strip when said drive means moves the body strip; and said engagement of the rollers with the surface and body strip causing said rollers to rotate when the strips are moving in unison.

3. The method of welding a surface strip having a precious metal surface to a body strip, the welded strips to be at least partially fabricated into electrical spring contacts by a progressive die comprising the steps of:

providing a progressive die having a fixed die pad bolster and a reciprocating punch pad bolster mounted to move in a working stroke from a return position toward the die pad bolster and then in a return stroke away from the die pad bolster to the return position, punch and die means respectively mounted on the bolsters, and drive means for moving a flat body strip along a horizontal axis between the bolsters when the punch pad bolster is in the return stroke and for stopping the body strip when the punch pad bolster is in the working stroke for working by said punch and die means to form electrical contacts;

providing an elongated, flat body strip;

providing an elongated surface strip, the topside of which has a contoured precious metal surface and the underside of which has a pair of welding tips extending parallel one another along the axis of the surface strip;

providing a first electrode in the form of a first roller rotatably mounted on the fixed die pad bolster and electrically insulated therefrom and having a flat circumferential surface;

providing second electrode in the form of a second roller rotatably mounted on the fixed die pad bolster above said first roller and electrically insulated from the fixed die pad bolster and having a circumferential surface the same shape as the contour of said precious metal surface and being plated with precious metal the same as the precious metal surface on said surface strip;

providing a source to supply power to said electrodes;

using the punch and die means forming a capture slot extending along the axis of the body strip and on the bottom of the capture slot forming a plurality of welding beads serially spaced along the slot and extending normal to the axis of the body strip;

after the forming of said capture slot and said beads, placing said surface strip in said capture slot and positioning said strips between said rollers with the underside of the body strip engaging the flat circumferential surface of the first roller and the contoured circumferential surface of the second roller engaging the contoured precious metal surface strip whereby said welding tips engage one of said welding beads;

providing spring means urging the first and second rollers together whereby said tips tightly engage said bead;

twice energizing said electrodes from said source during each said return stroke and during the time when the strips are moving and the rollers are rotating, one energizing period occuring when said rollers are aligned with one bead and the next period occuring when the rollers are aligned with the next adjacent bead;

the welding of the surface strip to the body strip causing the surface strip to move in unison with the body strip when said drive means moves the body strip; and said engagement of the rollers with the surface and body strip causing said rollers to rotate when the strips are moving in unison.

* * * * *